United States Patent [19]
Seymour

[11] Patent Number: 5,727,378
[45] Date of Patent: Mar. 17, 1998

[54] GAS TURBINE ENGINE

[75] Inventor: Jeffrey L. Seymour, Menasha, Wis.

[73] Assignee: Great Lakes Helicopters Inc., Neenah, Wis.

[21] Appl. No.: 519,672

[22] Filed: Aug. 25, 1995

[51] Int. Cl.$^6$ .................. F02C 3/06; F02C 7/08
[52] U.S. Cl. .................. 60/39.36; 60/732; 60/738; 60/739; 60/756; 60/758; 60/759
[58] Field of Search .................. 60/39.36, 732, 60/737, 738, 739, 740, 746, 756, 758, 759; 239/432, 434

[56] References Cited

U.S. PATENT DOCUMENTS

| | | | |
|---|---|---|---|
| 4,794,754 | 1/1989 | Shekleton et al. | 60/39.36 |
| 4,825,640 | 5/1989 | Shekleton | 60/39.36 |
| 4,862,693 | 9/1989 | Batakis et al. | 60/739 |
| 4,891,936 | 1/1990 | Shekleton | 60/39.36 |
| 4,897,994 | 2/1990 | Shekleton | 60/39.06 |
| 4,920,740 | 5/1990 | Shekleton | 60/39.141 |
| 4,926,630 | 5/1990 | Shekleton | 60/39.36 |
| 4,928,479 | 5/1990 | Shekleton et al. | 60/39.36 |
| 4,930,306 | 6/1990 | Shekleton | 60/39.36 |
| 4,936,090 | 6/1990 | Shekleton | 60/39.141 |
| 4,938,020 | 7/1990 | Shekleton et al. | 60/39.36 |
| 4,944,152 | 7/1990 | Shekleton | 60/39.36 |
| 4,949,545 | 8/1990 | Shekleton | 60/756 |
| 4,955,192 | 9/1990 | Shekleton | 60/39.36 |
| 4,955,201 | 9/1990 | Shekleton et al. | 60/738 |
| 4,967,562 | 11/1990 | Shekleton et al. | 60/738 |
| 4,967,563 | 11/1990 | Shekleton | 60/743 |
| 4,984,424 | 1/1991 | Shekleton | 60/39.94 |
| 4,989,404 | 2/1991 | Shekleton | 60/39.36 |
| 4,993,220 | 2/1991 | Shekleton | 60/39.36 |
| 4,996,837 | 3/1991 | Shekleton | 60/39.36 |
| 5,001,895 | 3/1991 | Shekleton et al. | 60/39.36 |
| 5,027,603 | 7/1991 | Shekleton et al. | 60/743 |
| 5,031,399 | 7/1991 | Batakis et al. | 60/39.32 |
| 5,033,263 | 7/1991 | Shekleton et al. | 60/39.32 |
| 5,040,371 | 8/1991 | Shekleton | 60/748 |
| 5,062,262 | 11/1991 | Shekleton et al. | 60/39.36 |
| 5,063,745 | 11/1991 | Shekleton et al. | 60/737 |
| 5,088,979 | 2/1992 | Koblish et al. | 239/404 |
| 5,097,666 | 3/1992 | Shekleton et al. | 60/737 |
| 5,101,620 | 4/1992 | Shekleton et al. | 60/39.36 |
| 5,101,634 | 4/1992 | Batakis et al. | 60/737 |
| 5,113,647 | 5/1992 | Shekleton | 60/39.36 |
| 5,113,648 | 5/1992 | Shekleton et al. | 60/39.091 |
| 5,119,636 | 6/1992 | Batakis et al. | 60/739 |
| 5,129,224 | 7/1992 | Shekleton | 60/39.36 |
| 5,131,221 | 7/1992 | Shekleton | 60/39.091 |
| 5,140,807 | 8/1992 | Shekleton et al. | 60/39.36 |
| 5,140,808 | 8/1992 | Shekleton et al. | 60/39.36 |
| 5,150,570 | 9/1992 | Shekleton | 60/39.36 |
| 5,163,284 | 11/1992 | Shekleton | 60/39.36 |
| 5,167,122 | 12/1992 | Shekleton | 60/743 |
| 5,172,546 | 12/1992 | Shekleton et al. | 60/39.36 |
| 5,174,108 | 12/1992 | Shekleton | 60/39.36 |
| 5,177,955 | 1/1993 | Shekleton | 60/39.36 |
| 5,177,956 | 1/1993 | Shekleton | 60/39.36 |

(List continued on next page.)

*Primary Examiner*—Charles G. Freay
*Attorney, Agent, or Firm*—Thomas D. Wilhelm

[57] ABSTRACT

This invention pertains to small air breathing gas turbine engines (1). Engines of the invention employ improved combustion systems, including improved fuel injection systems and improved combustor design. These improvements enable the engine to idle at speeds as low as one-tenth the maximum operating speed of the engine, which gives the engine an increased range of operating speeds. The improved designs generally provide for pre-mix assemblies intimate with the fuel injectors, a typically flame-free primary "A" mixing zone in the combustion chamber, and a primary "B" combustion zone, in addition to the secondary combustion zone and the dilution zone. In preferred embodiments, the bearing assembly is located between the compressor and the turbine wheel. A cooling cavity is provided between the turbine wheel and the bearing assembly, thus protecting the bearings from the turbine heat. A toroidally-shaped compressor discharge plenum between the compressor and the turbine wheel serves as an air accumulator, an air shock absorber, and an air stabilizer. Resiliently deflectable leaf spacers position the dome of the combustor from the rear casing wall.

39 Claims, 6 Drawing Sheets

U.S. PATENT DOCUMENTS

| | | | |
|---|---|---|---|
| 5,205,117 | 4/1993 | Shekleton | 60/39.06 |
| 5,207,054 | 5/1993 | Rodgers et al. | 60/39.36 |
| 5,207,055 | 5/1993 | Shekleton et al. | 60/39.36 |
| 5,211,005 | 5/1993 | Hounanian | 60/39.32 |
| 5,214,911 | 6/1993 | Shekleton | 60/39.06 |
| 5,220,794 | 6/1993 | Sledd et al. | 60/737 |
| 5,233,825 | 8/1993 | Shekleton | 60/39.36 |
| 5,237,813 | 8/1993 | Harris et al. | 60/39.36 |
| 5,241,818 | 9/1993 | Shekleton et al. | 60/39.36 |
| 5,261,224 | 11/1993 | Shekleton et al. | 60/39.36 |
| 5,263,316 | 11/1993 | Shelketon et al. | 60/39.36 |
| 5,277,021 | 1/1994 | Shekleton | 60/39.36 |
| 5,277,022 | 1/1994 | Shekleton | 60/39.36 |
| 5,303,543 | 4/1994 | Shah et al. | 60/39.36 |
| 5,305,596 | 4/1994 | Lampe et al. | 60/39.06 |
| 5,317,864 | 6/1994 | Shorb et al. | 60/39.36 |
| 5,331,803 | 7/1994 | Shekleton | 60/39.36 |
| 5,363,644 | 11/1994 | Shekleton | 60/39.36 |

5,727,378

GAS TURBINE ENGINE

FIELD OF THE INVENTION

This invention relates generally to air breathing turbine engines, and preferably to such engines as used on air vehicles.

BACKGROUND OF THE INVENTION

A number of small gas turbine engines of six inches diameter and less have been produced for the radio control model aircraft market and the small unmanned aerial vehicle (UAV) market. These engines have been used with some success. However, further improvements are desirable in some areas of operation. The larger such engines have been relatively expensive, of limited commercial availability, and sometimes unreliable. The most commonly available smaller such engines have used potentially hazardous propane fuel.

Because of limitations with reliability and durability, such engines have only been available sporadically in the commercial market. And while an exhaustive amount of research has been reported through e.g. the patents of one inventor, namely Jack Shekleton, the inventor herein is not aware of any prior art engines offering the combination of low cost, a broad range of engine speeds, and long term reliability.

Thus, it is desirable to produce a small gas turbine engine which fulfills the needs of the current marketplace for the uses previously described, and which is relatively inexpensive to produce. There is a demand for such engines which have a wide range of operating speeds, are low in cost, and are capable of longer operating life and improved reliability.

It is an object of this invention to provide improvements in gas turbine engines, structure, and associated methods of operation and manufacture which advance the performance capabilities of gas turbine engines. These advancements, as evidenced in the invention herein, are incorporated into a family of low cost, improved-performance gas turbine engines, for use as e.g. propulsion systems for aeromodeling and small unmanned aerial vehicle markets, and alternatively as sources of e.g. shaft horsepower.

SUMMARY OF THE DISCLOSURE

Some aspects of the invention are achieved in a first family of embodiments comprehending a fuel injection system for a turbine engine. The turbine engine has a combustor including walls defining a combustion chamber. The fuel injection system comprises a pre-mix assembly. The pre-mix assembly comprises (i) at least one atomization button for extending through a wall of the combustor, the at least one atomization button having an internal passage, and a discharge end of the internal passage for extending into the combustion chamber, and (ii) a fuel supply tube disposed in the internal passage of the atomization button, the fuel supply tube having a central axis, and a fuel exit opening for discharging fuel therefrom into the internal passage of the atomization button at a locus spaced from the discharge end, the fuel exit opening being so oriented within the internal passage that air passing through the internal passage and past the exit opening describes an angle between about 45 degrees and about 135 degrees with at least one of the central axis of the fuel supply tube, fuel being expressed from the fuel supply tube, the exit opening in the fuel supply tube, or with fuel travelling in a direction controlled by an extension finger at the fuel exit opening.

Preferably, the internal passage of the atomization button has an inlet end opposite the discharge end with the internal passage being aligned with the fuel supply tube proximate the inlet end.

Preferably, the fuel exit opening is free from burrs and similar disturbances such that fuel emerges from the fuel exit opening in a pattern aligned with the central axis, unless otherwise controlled by an extension finger or the like.

Preferably, the internal passage is so configured, and the fuel exit opening is so oriented within the internal passage, that air passing through the internal passage and past the exit opening changes direction by at least 45 degrees proximate the fuel exit opening.

The portion of the internal passage between the fuel exit opening and the discharge end of the internal passage preferably defines an atomization zone wherein mixing of fuel with air to form a substantially mixed mixture of fuel and air occurs before the fuel and air exit the atomization button.

The invention further comprehends a second family of embodiments comprehending a method of introducing fuel and air into a combustor in a turbine engine, the combustor including at least an outer wall enclosing a combustion chamber, the turbine engine including a pre-mix assembly comprising at least one atomization button extending through a wall of the combustor, the at least one atomization button having an internal passage, a discharge end of the internal passage extending into the combustion chamber, and a fuel supply tube disposed in the internal passage, the fuel supply tube having a central axis. The method includes the steps of discharging fuel from an exit opening in the fuel supply tube into the internal passage of the atomization button at a locus spaced from the discharge end of the internal passage; and passing air into and through the internal passage, and past the exit opening of the fuel supply tube at an angle between about 45 degrees and about 135 degrees with the central axis of the fuel supply tube, to thereby create, in the at least one atomization button, a fuel-air mixture, and a condition wherein, at fuel pressure below 10 pounds per square inch gauge in combination with air pressure below 10 pounds per square inch gauge, fuel mixes with air to form a substantially mixed fuel-air mixture before the fuel and air exit the atomization button.

The method preferably comprises discharging at least one stream of the fuel-air mixture from a respective atomization button into the combustor, and directing the at least one stream away from the outer wall of the combustor, inwardly of the combustor, and generally transverse to the longitudinal axis of the combustor.

Air and fuel pressures supplied to the pre-mix assemblies are preferably each less than 10 pounds per square inch gauge (psig), more preferably less than 5 psig, still more preferably less than 2 psig, and may be as low as 1 psig, preferred methods, for low speed operation of the turbine engine, including mixing fuel with the air without substantial physical rending of droplets of fuel.

The method preferably includes maintaining a fuel-air mixture excessively rich in fuel in the at least one atomization button such that the fuel-air mixture in the at least one atomization button cannot burn, and maintaining air flow rate in the at least one atomization button sufficiently low that the air passing through the at least one atomization button cannot physically rend the fuel being expressed from the fuel supply tube.

A third family of embodiments of the invention comprehends a combustion assembly for a turbine engine, the combustion assembly including a combustor having a leading end and a trailing end, a longitudinal axis, an outer wall spaced from, and extending about and along the longitudinal axis, air inlet openings in the outer wall, an inner wall extending about and along the longitudinal axis between the longitudinal axis and the outer wall, and a dome connecting the outer and inner walls at the leading end of the combustor at respective first outer and second inner annular lines of intersection therewith, thereby forming a combustion chamber between the inner and outer walls, an outer casing extending about the combustor to thereby define an annular liner passage between the outer wall and the outer casing, the outer wall comprising a tube and including a base outer surface, and a plurality of axially spaced air inlet openings formed in, and as integral parts of, the tube, for directing air, from loci adjacent the base outer surface, generally circumferentially and tangentially into the combustion chamber.

In the combustion assembly, the outer wall may have an inner surface disposed inside the combustion chamber, the outer surface opposing the inner surface and being outside the combustion chamber, the air inlet openings comprising channels formed in the outer wall and extending inwardly of the outer surface, into the combustor at upstream sides of the respective air inlet openings, and crowns formed in the outer wall and extending outwardly of the inner surface of the outer wall and away from the combustion chamber, at downstream sides of the respective air inlet openings, the channels and the crowns, in combination, at the respective air inlet openings, being disposed and configured to direct air, from the outer surface generally circumferentially into the combustion chamber.

Preferably, the combustion chamber has an annular configuration between the inner and outer walls.

The combustor preferably includes a fuel injection system, including pre-mix assemblies spaced about and propinquant the first outer annular line of intersection, each pre-mix assembly comprising an atomization button and a fuel supply tube in the respective atomization button, for introducing fuel and air into the combustion chamber adjacent the first outer annular line of intersection, by directing, into the combustion chamber, streams of mixtures of fuel and air at locations spaced about the first outer annular line of intersection, the streams of mixtures of fuel and air expressed from the pre-mix assemblies being directed circumferentially away from the outer wall, inwardly of the combustor, and generally transverse to the longitudinal axis for further mixing in an adjacent, substantially flame free, primary "A" mixing zone.

The air inlet openings preferably include a first set disposed proximate the atomization buttons, away from the dome, preferably a distance of between 0.1 inch and 0.5 inch further away from the dome than the atomization buttons.

Preferably, each air inlet opening in the first set is disposed circumferentially upstream and adjacent a respective atomization button, and is oriented to direct air into the combustion chamber and alongside the respective discharge button, thereby to form a primary "B" combustion zone adjacent and downstream of the generally flame free primary "A" mixing zone.

Preferred ones of the embodiments include a second set of the air inlet openings disposed, from the first set, away from the dome, to thereby form a secondary zone in the combustor, and a third set of the air inlet openings disposed, from the second set, away from the dome, to thereby form a dilution zone in the combustor.

Preferably, individual air inlet openings in the second set are rotationally displaced from respective individual air inlet openings in the first set, with preferred angles of rotation being between 30 degrees and 40 degrees.

In combustion assemblies of the invention, each atomization button preferably has an internal passage, and a discharge end extending into the combustion chamber, the fuel supply tube being disposed in the internal passage, having a central axis and a fuel exit opening for discharging fuel therefrom into the internal passage at a locus spaced from the discharge end, the fuel exit opening being so oriented within the internal passage that air passing through the internal passage and past the fuel exit opening describes an angle between about 45 degrees and about 135 degrees with the central axis of the fuel supply tube, the combustion assembly being adapted to sustain combustion, as part of a turbine engine, at engine speeds of less than 40,000 revolutions per minute (rpm), preferably less than 30,000 rpm, more preferably less than 20,000 rpm, and most preferably at speeds at as low as 10,000 rpm, or less. Operation of the engine at such low speeds is typically accompanied by low fuel and air pressures, such as where air and fuel pressures are as low as about 1 pound per square inch gauge (psig).

The invention further comprehends a combustion assembly for a turbine engine, the combustion assembly including a combustor having a leading end and a trailing end, a longitudinal axis, an outer wall spaced from, and extending about and along the longitudinal axis, air inlet openings in the outer wall, an inner wall extending about and along the longitudinal axis between the longitudinal axis and the outer wall, and a dome connecting the outer and inner walls at the leading end of the combustor at respective first outer and second inner annular lines of intersection therewith, thereby forming a combustion chamber between the inner and outer walls, an outer casing extending about the combustor to thereby define an annular liner passage between the outer casing and the outer wall and the dome, one of the dome and the outer casing comprising at least one resiliently deflectable spacer spacing the dome from the outer casing such that the at least one resiliently deflectable spacer is in physical contacting abridgement between the dome and the outer casing during operation of the combustor.

Preferably, the at least one resiliently deflectable spacer maintains a constant contact between the dome and the outer casing, and accommodates changes in the distance between the dome and the outer casing, in the combustion assembly, by resiliently deflecting in cooperation with thermal expansion and contraction of the dome and the outer casing.

In a fourth family of embodiments, the invention comprehends a method of sustaining combustion in a combustor in a turbine engine at low speeds, the combustor having a leading end and a trailing end, a longitudinal axis, an outer wall spaced from, and extending about and along the longitudinal axis, an inner wall extending about and along the longitudinal axis between the longitudinal axis and the outer wall, and a dome connecting the outer and inner walls at the leading end of the combustor at respective first outer and second inner annular lines of intersection therewith, thereby forming a combustion chamber between the inner and outer walls, the outer wall having inner and outer surfaces thereof, and air inlet openings spaced about and extending through the outer wall, an outer casing extending about the combustor, and including extending rearwardly of the dome in the turbine engine, to thereby define an annular liner passage between the outer wall and the outer casing, the combustor further comprising at least two pre-mix assemblies spaced about and proximate the first outer annular line of intersection, each pre-mix assembly comprising an atomization button, and a fuel supply tube in the respective atomization button, each atomization button having an internal passage extending into the combustion chamber, each fuel supply tube having a central axis and a fuel exit opening for discharging fuel therefrom into the internal passage, the method comprising expressing fuel from the fuel exit opening, and passing air through the internal passage and past the fuel exit opening at an angle between about 45 degrees and about 135 degrees with at least one of the central axis of the fuel supply tube and fuel being expressed in a controlled direction, to thereby form a first mixture of fuel and air, expressing the thus formed first mixture of fuel and air into a mixing zone in the combustion chamber where the fuel and air are further mixed with each other, subsequently passing the first mixture of fuel and air into a combustion zone and mixing in additional air at the combustion zone to form a second mixture, combusting the second mixture, and thereby sustaining combustion in the combustion chamber at speeds of no more than 20,000 rpm.

Preferably, the method includes the step of changing the direction of flow of the air in the internal passage by at least 45 degrees adjacent the fuel exit opening.

Also preferably, the method includes expressing the mixture into the combustion chamber in a condition excessively rich in fuel such that the first mixture as expressed is non-combustible, further mixing the first mixture in a mixing zone substantially free from flame, and immediately adjacent the discharge end of each atomization button, the mixing zone being in the combustion chamber, between the atomization button and the combustion zone, and thereby insulating the dome from heat of combustion at high speed operation.

Further, the method preferably includes the step of introducing air into the combustion chamber through the air inlet openings by causing the air at the air inlet openings to traverse respective smooth curvilinear paths between the outer surface of the outer wall, through the respective air inlet openings to the inner surface of the outer wall thereby to form a generally continuous layer of air about the outer wall, between the inner surface of the outer wall and the combustion zone.

A fifth family of embodiments comprehends a turbine engine comprising a supporting engine frame assembly; a compressor, mounted on a shaft; a turbine wheel mounted on the shaft, and adapted to drive the compressor by means of the shaft; a combustor for receiving compressed air from the compressor and fuel from a fuel source, and generating gases of combustion therefrom; a nozzle for directing the gases of combustion toward the turbine wheel; and a bearing assembly, disposed between the compressor and the turbine wheel, mounting the shaft to the supporting engine frame assembly.

Preferably, the shaft has a longitudinal axis, the supporting engine frame assembly comprises a bearing housing, a bearing sleeve is disposed between the bearing assembly and the bearing housing, the bearing assembly comprises a front bearing relatively proximate the compressor and a rear bearing relatively proximate the turbine wheel, an expandable bearing spacer is disposed between the front and rear bearings, a bearing cup is disposed between the bearing sleeve and at least one of the front and rear bearings, with the bearing cup being generally movable with respect to the bearing sleeve and being keyed to the bearing sleeve such that the bearing cup is precluded from rotating with the respective bearing, and has limited movement along the longitudinal axis.

In preferred embodiments, the turbine engine has a front and a rear, and a length therebetween, the supporting engine frame assembly further comprises an outer casing extending along the length of the turbine engine, an annular liner passage is disposed between the outer casing and the combustor, the bearing housing being fixed in position relative to the outer casing, the turbine engine including a compressor discharge plenum disposed rearwardly in the turbine engine of the compressor and frontwardly of the annular liner passage, the compressor discharge plenum being configured to receive air from the compressor and to accommodate flow of the air toward and away from the longitudinal axis, generally along an imaginary plane-like surface passing through the length of the longitudinal axis, whereby the compressor discharge plenum can operate as a pneumatic accumulator.

Preferably, the supporting engine frame assembly comprises a rear bearing end plate between the bearing sleeve and the turbine wheel, a bearing seal plate between the rear bearing end plate and the turbine wheel, a cooling cavity between the rear bearing end plate and the bearing seal plate, the cooling cavity being defined by walls surrounding the cooling cavity, at least one inlet port in one wall and in communication with the compressor, for receiving compressed air into the cooling cavity, and at least one outlet port in one wall and in communication with the turbine wheel, for discharging air from the cooling cavity toward the turbine wheel, whereby compressed air flows into, through, and out of the cooling cavity, between the rear bearing end plate and the bearing seal plate, and away from the cooling cavity toward the turbine wheel, thus thermally insulating the bearing assembly from destructive affects of heat present at the turbine wheel.

In a sixth family of embodiments, the invention comprehends a turbine engine having a front, a rear, and a length therebetween, the turbine engine comprising a supporting engine frame assembly, including an outer casing extending along the length of the turbine engine; a compressor, mounted on a shaft, the shaft having a longitudinal axis; a turbine wheel mounted on the shaft, and adapted to drive the compressor by means of the shaft; a combustor for receiving compressed air from the compressor and fuel from a fuel source, and generating gases of combustion therefrom; a nozzle for directing the gases of combustion toward the turbine wheel; an outer casing extending along the length of the turbine engine; an annular liner passage between the outer casing and the combustor; and a compressor discharge plenum disposed rearwardly in the turbine engine of the compressor and frontwardly of the annular liner passage, the compressor discharge plenum being configured to receive air from the compressor and to accommodate flow of the air toward and away from the longitudinal axis, generally along an imaginary plane-like surface extending along the longitudinal axis, whereby the compressor discharge plenum can operate as a pneumatic accumulator.

In a seventh family of embodiments, the invention comprehends a turbine engine having a front and a rear, and comprising a supporting engine frame assembly; a compressor, mounted on a shaft; a turbine wheel mounted on the shaft, and adapted to drive the compressor; a combustion assembly, including a reverse flow combustor for receiving compressed air from the compressor and fuel from a fuel source, and generating gases of combustion therefrom; and a nozzle for directing the gases of combustion toward the turbine wheel, the combustion assembly having a leading end disposed toward the rear of the turbine engine, and a trailing end disposed toward the front of the turbine engine, a longitudinal axis, an outer wall, the outer wall being spaced from, and extending about and along the longitudinal axis, an inner wall extending about and along the longitudinal axis between the longitudinal axis and the outer wall, an inner casing extending about and along the longitudinal axis between the longitudinal axis and the inner wall, and a dome of the combustor connecting the outer and inner walls at the leading end of the combustor at respective first outer and second inner annular lines of intersection therewith, thereby forming a combustion chamber between the inner and outer walls, an outer casing extending about the combustor rearwardly of the dome, an air passage between the outer casing and the outer wall and the dome, the outer wall having an inner surface disposed inside the combustion chamber and an opposing outer surface outside the combustion chamber, the air inlet openings comprising channels formed in the outer wall and extending inwardly of the inner surface of the outer wall, into the combustor at upstream sides of the respective air inlet openings, and crowns formed in the outer wall and extending outwardly of the outer surface of the outer wall, and away from the combustion chamber, at downstream sides of the respective air inlet openings, the channels and the crowns, in combination at the respective air inlet openings being disposed and configured to direct air, from outside the outer wall, generally circumferentially into the combustion chamber, thereby to cool the inner surface of the outer wall and provide air to the combustion chamber.

Preferably, the combustor includes a fuel injection system, including pre-mix assemblies spaced about the first outer annular line of intersection, each pre-mix assembly comprising an atomization button and a fuel supply tube in the respective atomization button, for introducing fuel and air into the combustion chamber adjacent the first outer annular line of intersection, by directing, into the combustion chamber, streams of mixtures of fuel and air at locations spaced about the first outer annular line of intersection, the streams of mixtures of fuel and air expressed from the pre-mix assemblies being directed circumferentially away from the outer wall, inwardly of the combustor, and generally transverse to the longitudinal axis for further mixing in an adjacent primary "A" mixing zone substantially free from flame during high speed operation of the turbine engine, and thereby insulating the dome from the heat of combustion.

The turbine engine preferably comprises an inner casing disposed inwardly of the inner wall, the air passage extending from the dome toward the trailing end of the combustion assembly between the inner wall and the inner casing, and including an exhaust opening into the combustion chamber, thereby providing cooling air to the inner wall.

Preferably the channels are confined inwardly of the inner surface of the outer wall and the crowns are confined outwardly of the inner surface of the outer wall, whereby air entering the combustion chamber through the air inlet openings traverses a smooth curvilinear path from the outer surface of the outer wall, through the respective air inlet openings, to the inner surface of the outer wall, and forms a generally continuous layer of air about the outer wall, between the inner surface of the outer wall and a combustion zone inside the combustion chamber.

Figure 1:
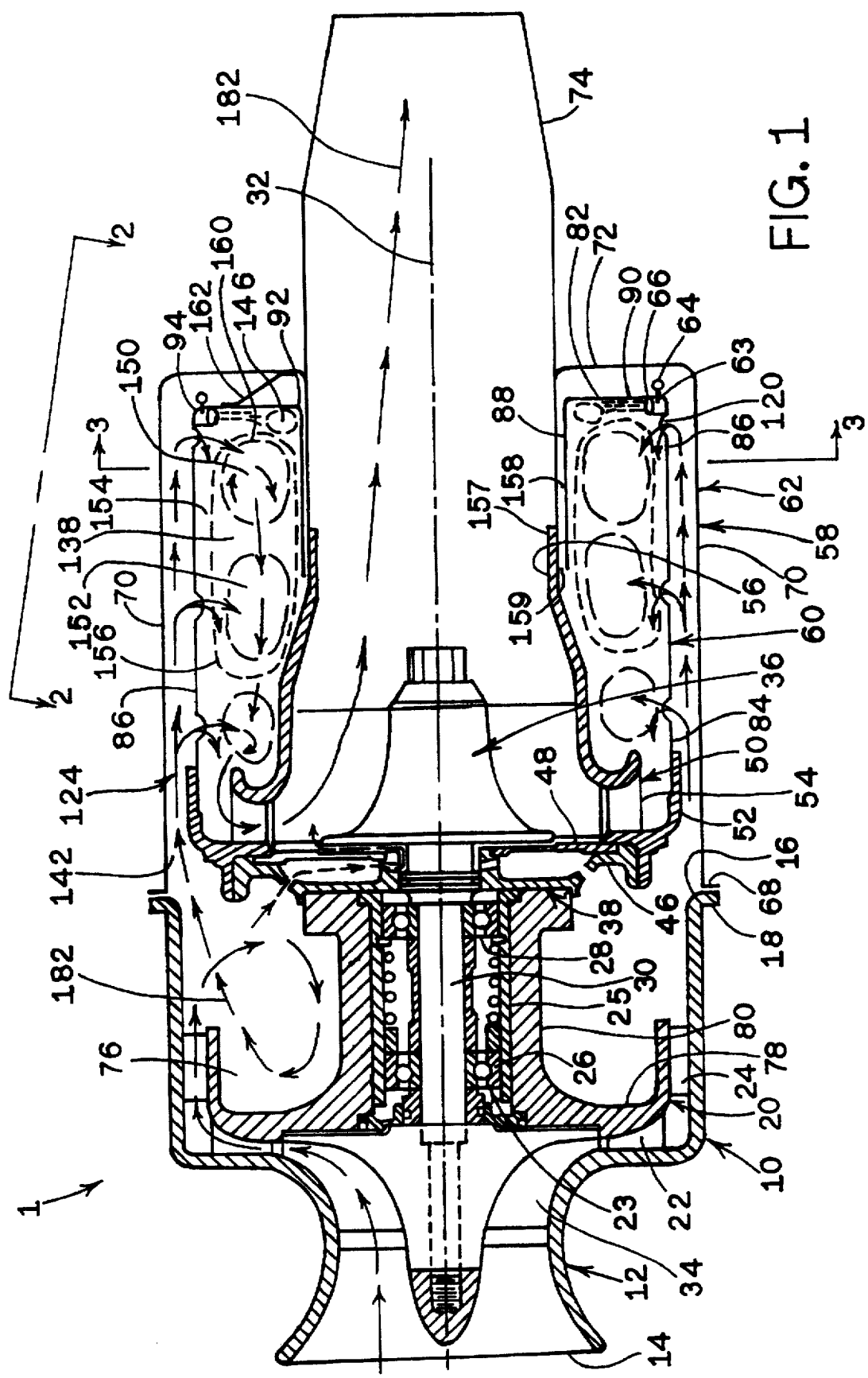
FIG. 1 shows a cross section of a turbine engine of the invention, without rotational displacement of the air inlet ports.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring now by characters of reference to the drawings, and first to FIG. 1, an exemplary embodiment of a small diameter gas turbine engine 1 is illustrated in FIG. 1. Generally, the engine will be in the form of a thrust-producing engine. It should be understood, however, that the engine may be utilized in a variety of environments, including an environment wherein power is taken from a rotating shaft coupled to the engine.

The turbine engine 1 of the invention includes a supporting frame assembly 10 comprising a bell shaped air inlet housing 12 and a bearing housing 20. The air inlet housing 12 has a forwardly facing open front end 14 corresponding with the front of the engine 1, through which air enters the engine, and a backwardly facing open rear end 16 disposed toward the rear of the engine, and terminating in a rear flange 18.

The bearing housing 20 is spaced rearwardly of, and centered upon, the air inlet housing 12, by a plurality of diffuser blades 22 and a deswirl cascade 24. The bearing housing 20 encompasses a bearing assembly 23 journaling the shaft 30 for rotation about longitudinal axis 32. Bearing assembly 23 is generally located between the compressor 34 and turbine wheel 36. The bearing assembly includes axially spaced front and rear bearings 26 and 28 respectively, spaced from the bearing housing 20 by bearing sleeve 25. Front bearing 26 is located proximate compressor 34 relative to rear bearing 28. Rear bearing 28 is located proximate turbine wheel 36 relative to front bearing 26.

Locating the bearings 26, 28 between the compressor and the turbine wheel provides for a balanced load on the bearings, whereas prior art small turbine engines positioned the bearings forward of the compressor. This placed a cantilevered load on the bearings, which can lead to premature bearing failure. On the other hand, prior to this disclosure, no structure was known for protecting the bearings from the heat at the turbine wheel if the bearings were positioned between the compressor and the turbine wheel. Such protecting structure is taught hereinbelow.

One end of the shaft 30 is coupled to the compressor 34, the compressor being disposed centrally within the open end 14 of the air inlet housing 12, and frontwardly of the front bearing 26, with the discharge of the compressor 34 being directed toward the diffuser blades 22. The opposing end of shaft 30 is coupled to turbine wheel 36, the turbine wheel 36 being disposed rearwardly of rear bearing 28. With the compressor 34 and turbine wheel 36 coupled in common to shaft 30, power generated at the turbine wheel 36 drives the compressor 34.

Figure 6:
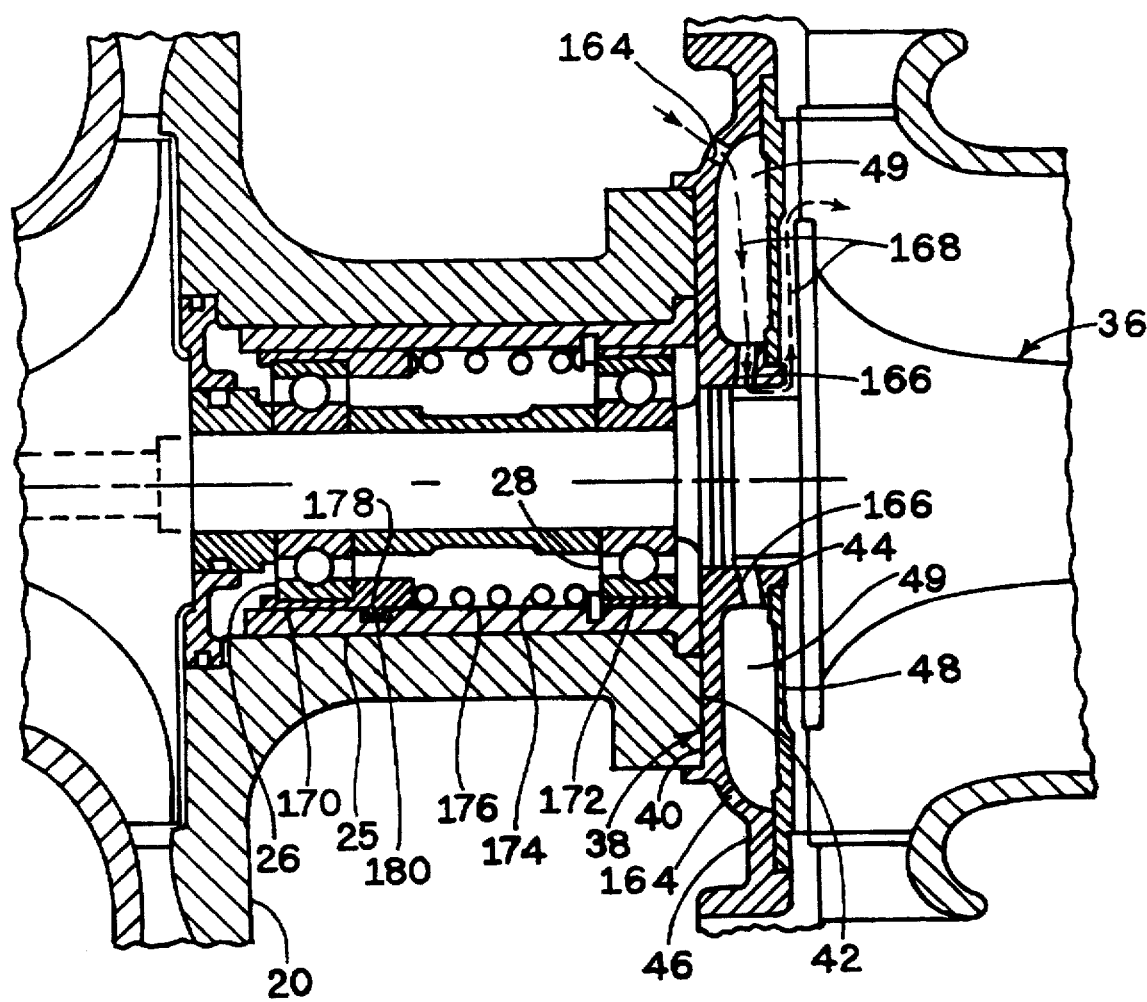
FIG. 6 shows an enlarged fragmentary cross section of the engine between the compressor and the turbine wheel, including the bearing assembly and its support elements.

As shown in FIG. 6, bearing end plate 38 includes a front end 40 mounted at the rear end 42 of bearing housing 20, a rearwardly extending, inwardly disposed annular sleeve 44, and a rearwardly extending, outwardly disposed bearing outer flange 46. Bearing seal plate 48 is mounted to bearing end plate 38, extending between annular sleeve 44 and bearing outer flange 46, rearwardly of front end 40, thus defining a cooling cavity 49 generally disposed between the bearing outer flange 46 and the bearing seal plate 42.

Referring back to FIG. 1, a nozzle assembly 50 is mounted to outer flange 46 of bearing end plate 38, interfaces with bearing seal plate 48, and extends generally rearwardly of the bearing end plate and outwardly of the turbine wheel. The nozzle assembly generally includes a forward nozzle housing element 52, a plurality of nozzle blades 54 extending rearwardly from the nozzle housing element 52, and an annular nozzle throat 56 extending generally rearwardly of the nozzle blades.

A combustion assembly 58 extends generally rearwardly in the engine of the nozzle assembly 50 and the air inlet housing 12 and, overall, generates gases of combustion. The combustion assembly 58 includes a reverse flow annular combustor 60, an outer casing 62, and a fuel injection system 63 including a fuel manifold 64 and a plurality of pre-mix assemblies 66. Combustor 60 interfaces with the nozzle assembly at rear portions of both the nozzle housing element 52 and the nozzle throat 56. A front flange 68 of the outer casing 62 is mounted to air inlet housing 12 at rear flange 18, thus mounting the combustion assembly, to the air inlet housing 12. Outer casing 62 includes an outer casing wall 70 disposed outwardly in the combustion assembly, and a rear casing wall 72 disposed rearwardly in the combustion assembly.

Exhaust tube 74 extends rearwardly of the engine from nozzle throat 56, and interfaces with rear casing wall 72, whereby the combustor is enclosed on its outer and rear surfaces by outer casing 62 and on its inner surface by nozzle throat 56 and exhaust tube 74.

Still referring to FIG. 1, compressor discharge plenum 76 is a toroidally-shaped cavity defined to the rear of compressor 34, behind front wall 78 of bearing housing 20, outwardly of hollow shaft 80 of bearing housing 20, generally frontwardly of flange 46 of bearing end plate 38, and frontwardly of the annular liner passage 124.

Referring now to FIGS. 2–5 in combination with FIG. 1, the combustor 60 as illustrated is a reverse flow annular combustor, and thus has a leading end 82 generally disposed toward the rear of turbine engine 1, and a trailing end 84 generally disposed toward the front of the turbine engine. The combustor 60 generally incorporates an outer wall 86 in the form of a metal tube having an outer surface 122 and an opposing inner surface 134. The combustor further includes an inner wall 88, and a dome 90 generally connected to, and joining, the inner and outer walls at respective annular lines of intersection 92 and 94.

Figure 2:
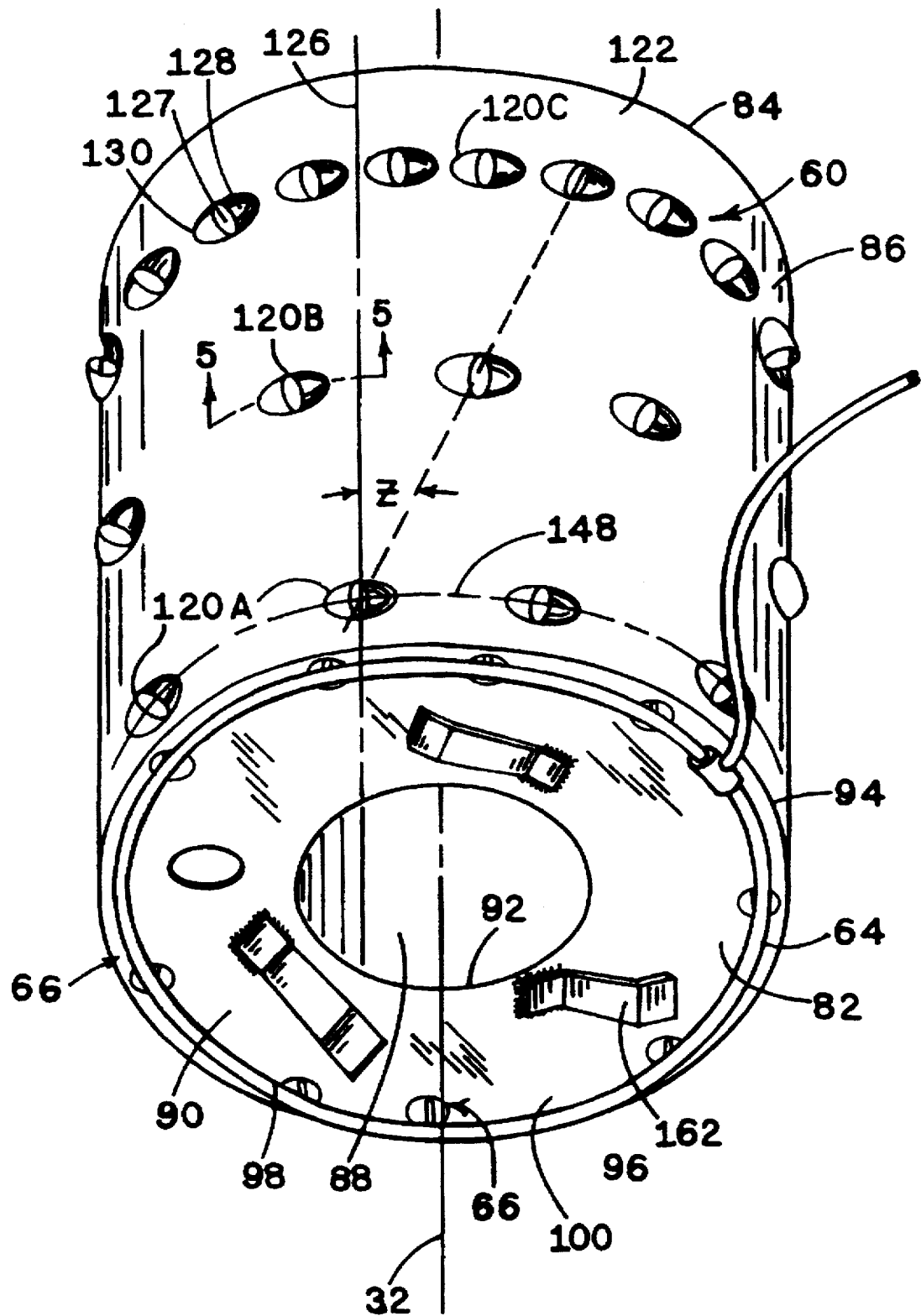
FIG. 2 shows a pictorial view of the combustor, and is representatively taken at 2—2 of FIG. 1.
Figure 3:
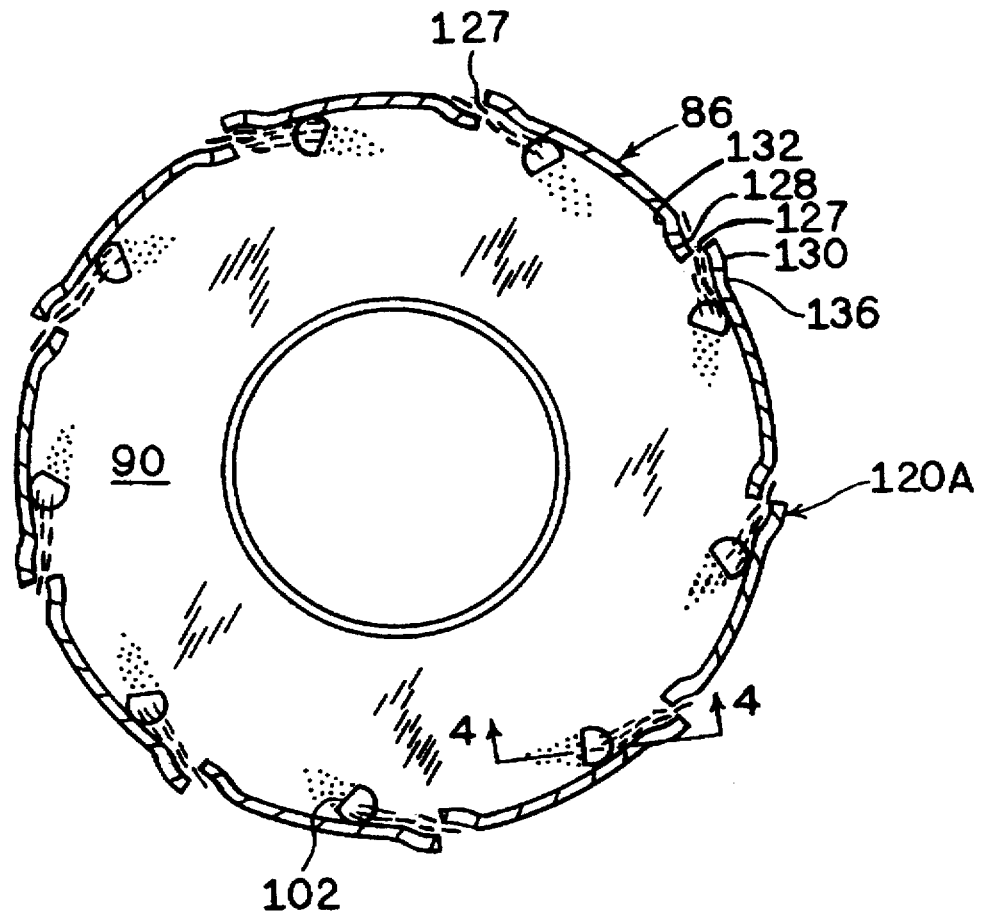
FIG. 3 shows a cross-section of the combustor taken at 3—3 of FIG. 1.
Figure 4:
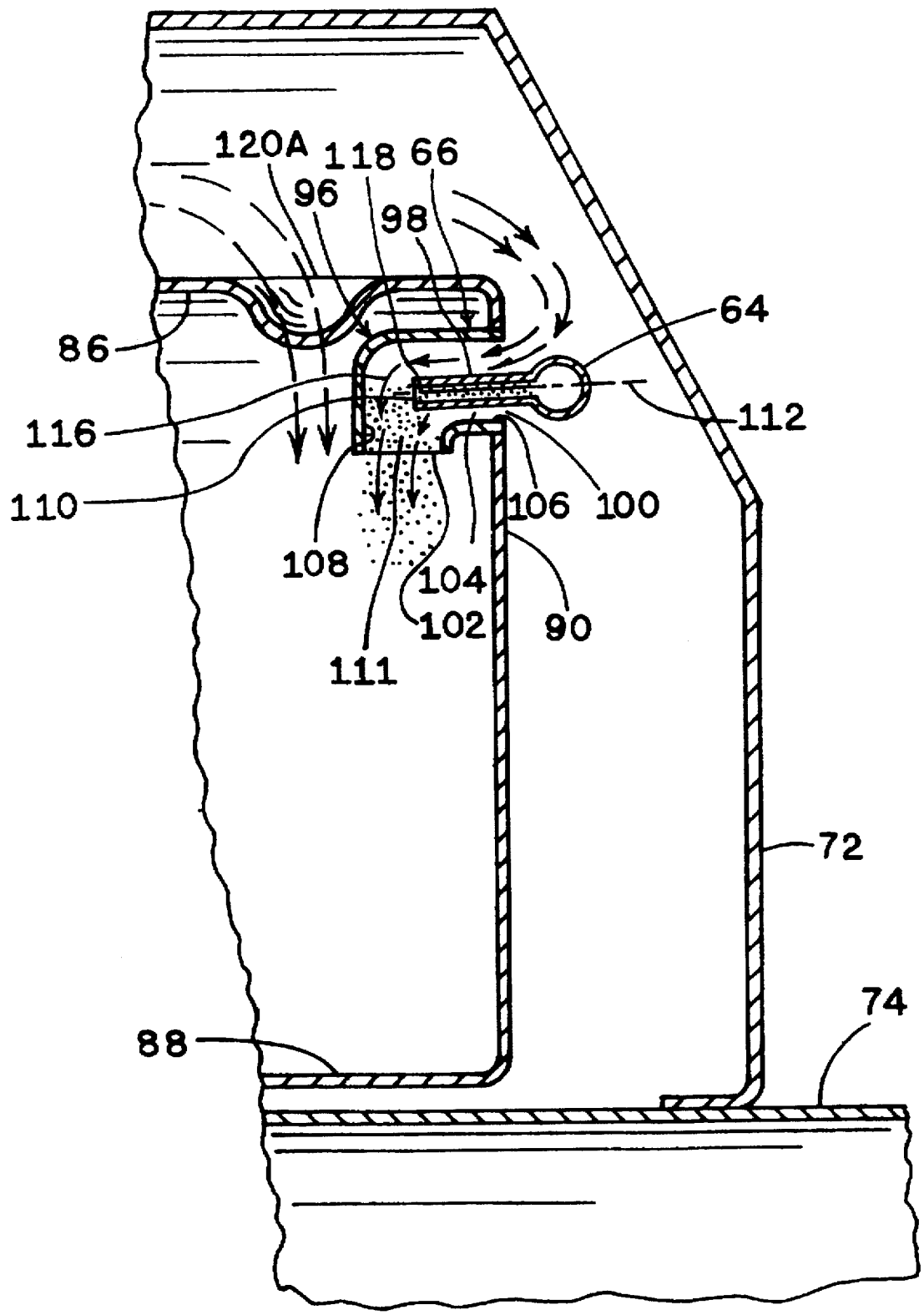
FIGS. 4 and 4A show cross sections of pre-mix assemblies, including respective atomization buttons and fuel supply tubes, taken at 4—4 of FIG. 3.

Referring now to FIGS. 2–4, the fuel manifold 64 is secured to the combustor by conventional securing means not shown, at locations spaced about the outer periphery of the dome 88, and passes over each of the pre-mix assemblies 66. Each pre-mix assembly 66 includes an atomization button 96 and a corresponding fuel supply tube 98, for providing e.g. kerosene or similar fuel which is liquid at ambient temperature and pressure.

Each atomization button 96 has an inlet end 100, a discharge end 102, and an internal passage 104 extending from the outer surface of dome 90, corresponding to the inlet end 100 of the atomization button, inwardly of the combustor, along the length of the atomization button, to the discharge end 102. In the embodiment shown, inlet walls 106 surround and define the internal passage at inlet end 100 and are aligned with the longitudinal axis 32 and with the fuel supply tube proximate the inlet end. Inlet walls 106 extend inwardly of the internal passage 104 until it turns 90 degrees whereafter discharge walls 108 surround the internal passage downstream of the 90 degree turn and adjacent the discharge end 102 of the internal passage. The discharge walls 108 are aligned transverse to the longitudinal axis 32, inwardly in the combustor 60, away from the outer wall 86, and extending generally parallel to the dome 90.

Accordingly, air traversing the internal passage of a given atomization button first travels through an inlet portion of the internal passage parallel to the longitudinal axis 32, then generally turns the 90 degree corner and progresses along the discharge portion of the internal passage in a direction transverse to the longitudinal axis, inwardly of the combustor and away from the outer wall, and generally parallel to the dome 90. Thus, in general, air traversing the atomization button 96 negotiates a 90 degree turn in the course of such traverse.

Fuel supply tube 98 extends, from the fuel manifold 64, into the respective atomization button 96, generally entering the atomization button at the inlet end 100 in alignment with the internal passage, and thus the inlet walls 106, at the inlet end. The fuel supply tube 98 preferably extends into the internal passage in a straight line from the fuel manifold, and terminates in the internal passage at a fuel exit opening 110 disposed at a locus displaced from the inner surface of the opposing discharge wall 108. As shown in FIG. 4, the central axis 112 of the fuel supply tube 98 is generally aligned with the internal passage at inlet end 100 and extends in a straight line to the fuel exit opening 110. Thus, typically, the fuel exits the fuel exit opening 110 in alignment with the axis 112, subject to direction changes urged by the air flowing through internal passage 104.

Figure 4A:
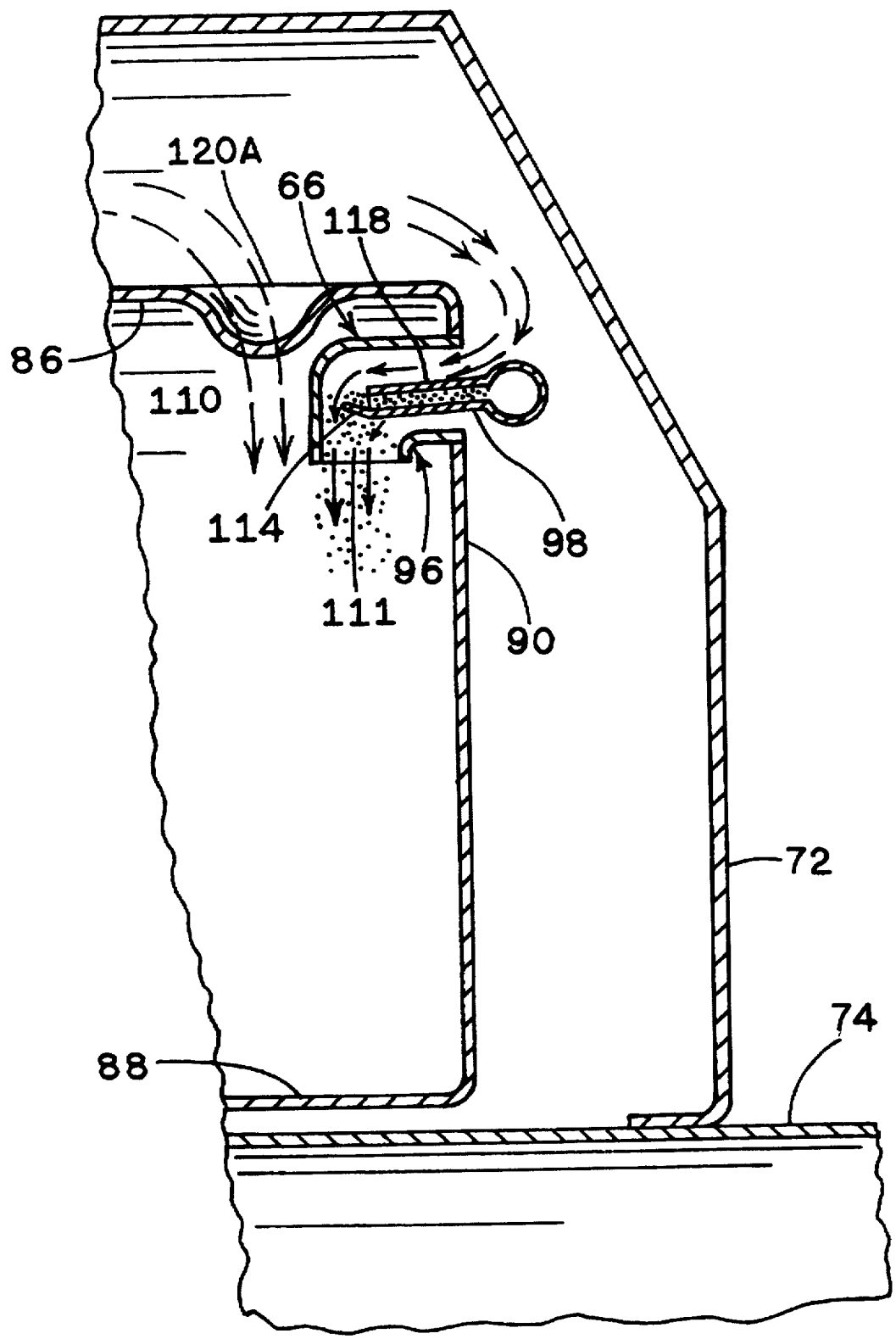

As illustrated in FIG. 4A, it is acceptable in this invention for the fuel supply tube 98 to incorporate a controlling finger 114 at the opening 110 which controls the direction at which fuel is discharged from the tube 98, or at low rates of fuel flow, provides an extended surface at the exit opening 110 from which fuel can evaporate or otherwise become, dispersed in air passing through the internal passage.

Arrows 116 illustrate the path of air as it traverses the internal passage 104 from the inlet end 100 to the discharge end 102. As seen in FIG. 4, air traversing the internal passage describes an angle of about 90 degrees with the central axis 112, and with fuel 118 exiting the tube 98 at the fuel exit opening 110. The angle between the air and the fuel, or the air and the axis of the fuel supply tube, can be somewhat more or less than 90 degrees. A range of about 45 degrees to about 135 degrees is acceptable, inclusive of all angles in between. However, angles closer 90 degrees, e.g. between about 75 degrees and about 105 degrees are preferred. Where a controlling finger 114 is used, the angle of 45 degrees to 135 degrees, with preference for about 75 degrees to about 105 degrees, is measured from the controlled direction being traversed by the fuel as a result of control applied by the finger 114.

Further, the air describes an angle between 45 degrees and 135 degrees with the direction in which the fuel supply tube extends at the fuel exit opening, and changes direction by at least 45, preferably at least 75 degrees, most preferably about 90 degrees, but typically no more than 135 degrees, adjacent the fuel exit opening 110, as illustrated by arrows 116.

As air moves past the fuel exit opening 110, fuel is received from the fuel exit opening into the air, and begins the process of intermingling with and mixing with the air in that portion of the internal passage which extends between the fuel exit opening and the discharge end 102, designated as the atomization zone 111 in FIG. 4.

As used herein, the process of "mixing" of fuel and air in the atomization zone, the "substantially mixed" condition, and the "mixtures" so produced, generally indicate a degree of intimacy between the fuel and air that exceeds the nominal relationship which exists between parallel streams of fuel and air travelling side by side, which nominal relationship is usually limited to diffusion at the margins of the respective streams of fuel and air. Rather, the mixtures produced in the atomization zone of the invention indicate a substantial mixing and intermingling of the main bodies of the fuel and air streams, not limited to diffusion at the margins; although the mixtures so produced may still be somewhat heterogeneous as they exit the discharge end 102 of the internal passage 104.

The physical process of intermingling and mixing the fuel and air takes on different characteristics depending on the rates of flow of fuel and air. At high rates of flow of fuel and air, the air is turbulent, and the fuel exits the fuel supply tube as a stream of liquid. Under such conditions, the air and fuel generally impact each other at the fuel exit opening whereupon the fuel is "atomized" by the combined turbulence of the fuel and air physically rending the droplets of liquid fuel into smaller generally liquid fragments. Atomization extant in engines of the invention, toward the upper end of the range of useful engine speeds, is greatly increased over atomization in prior art engines due to direct shear of the fuel stream as the fuel stream is in intimate contact with the turning air stream in the atomization zone.

By contrast, at low pressures and low rates of flow of fuel and air, air flow is generally more laminar in nature such that the air lacks sufficient energy to physically rend fuel droplets. Correspondingly, the rate of flow of fuel is sufficiently low that substantially all the fuel can evaporate from the fuel exit opening, or from a finger 114 at the fuel exit opening, whereby the transition of the fuel from liquid form in the fuel supply tube to a small particle size dispersed in the air generally follows the path of vaporization rather than that of physical rending of liquid droplets. This vaporization is facilitated by "movement" of the flame front toward the discharge end of the internal passage 104 at lower engine speeds, namely at low rates of fuel and air flow. As the flame front approaches the discharge end 102, a limited amount of heat is transferred from the flame to the atomization button, further enhancing fuel vaporization, as described hereinafter.

Whether at high pressure or at low pressure, in order that the rate and direction at which fuel flows be predictably controlled, it is axiomatic that the fuel exit opening must be aerodynamically clean, and correspondingly free from burrs and similar unintended obstructions that would affect the path of travel of fuel exiting the fuel exit opening 110.

Outer wall 86 incorporates a plurality of air inlet openings 120 for admitting air into the interior of the combustor 60, and for giving initial direction to the air as it enters the combustor. The air inlet openings generally direct air from loci adjacent the outer surface 122 of the outer wall 86 circumferentially into the combustor. The air inlet openings, in combination, include a first set of primary air inlet openings 120A adjacent the outer annular line of intersection 94 and axially aligned with each other, a second set of secondary air inlet openings 120B about midway along the length of the outer wall, toward the trailing end 84 of the combustor and axially aligned with each other, and a third set of dilution air inlet openings 120C disposed still further toward the trailing end 84 of the combustor and axially aligned with each other.

Corresponding individual air inlet openings in the first and second sets, and preferably also the third set, are rotationally displaced from each other at an angle "Z" corresponding with the angle of flow of air across the outer surface 122 of outer wall 86 as the air traverses the annular liner passage 124 between the outer wall 86 and outer casing wall 72. In the embodiment illustrated, angular swirl flow rotationally about the engine is imparted to the compressed air upstream of the combustor such that the air traverses an angle "Z" of about 36 degrees with a line 126 disposed at the outer surface of the outer wall 86 and parallel with the longitudinal axis 32. In general, the angle "Z" should be between about 30 degrees and about 40 degrees for efficient air flow into and through the combustion assembly 58.

Each air inlet opening 120 comprises a central annular port 127 in the outer wall 86, a channel 128 and a crown 130. Each channel 128 is formed in the outer wall 86 upstream of, and terminating at, the respective port 127. Each channel has a depth "D," measured from the inner surface 134 of the outer wall 86 and extending inwardly into the combustor 60, the depth being deepest at the respective opening 120, and shallowest at the edge 132 of the channel remote from the opening.

Similarly, each crown is formed in the outer wall 86 downstream of, and terminating at, the respective port 126. Each crown has a height "H" measured from the outer surface 122 of the outer wall 86, and extending away from the combustion chamber, the height being greatest at the respective port 127, and least at the edge 136 of the crown remote from the opening.

As used above, "upstream of" and "downstream of" refers to the direction of flow of air across the outer surface 122 of outer wall 86 and through the inlet openings 120.

As illustrated in the drawings, a channel and a crown are preferably associated with each port, with the channel and crown opposing each other at respective opposing sides of the port. As especially seen in FIG. 5, the crowns and channels are formed extensions of the sheet material from which the outer wall 86 is fabricated whereby the crowns, channels, and the main portions of the outer wall are the result of fabrications performed on a continuous element of sheet material. This is especially cost effective in that no additional elements need be provided, or assembled, in constructing the outer wall 86 as compared to the prior art e.g. U.S. Pat. No. 5,207,054 Rodgers et al where, for example, tubes and the like are welded into openings corresponding to ports 127. An additional advantage of the unitary construction of the air inlet openings 120, including ports 127, channels 128, and crowns 130, is that air traversing an air inlet opening 120 of the invention can make the transition from the annular liner passage 124 outside outer wall 86 to the interior of the combustor 60, namely into combustion chamber 138, by travelling along a smooth curvilinear path best illustrated by the dashed arrows 140 in FIG. 5. Thus the resistance to flow of air along the length of the annular liner passage is not impeded by tubes as in the prior art. Nor does the air necessarily move away from the outer surface 122 of outer wall 86 in order to enter an air inlet port. Accordingly, pressure losses between the inlet 142 of the annular liner passage 124 and the entrance of the air into the combustion chamber through air inlet openings 120 are reduced relative to the prior art. Further, potential air flow rates per square inch cross section of the annular liner passage are improved relative to the prior art because of the above reduction in impedance to air flow in the annular liner passage. Such improvement in air flow rates frees the designer of turbine engines of the invention to reduce the size of the cross-section to be used for the annular liner passage, and to allocate that space to other uses, such as to reducing the overall size of the turbine engine.

Figure 5:
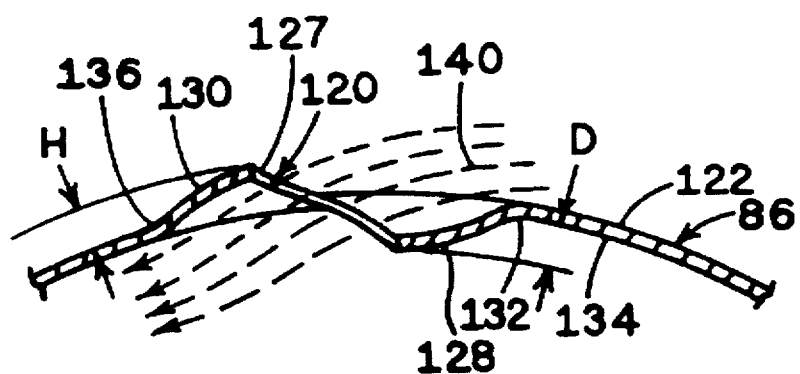
FIG. 5 shows a cross-section of an air inlet opening on the outer wall of the combustor, and is taken at 5—5, of FIG. 2.

Referring now to FIGS. 1, 3, and 5, air enters the combustor 60 through the atomization buttons 96, the primary air inlet openings 120A, the secondary air inlet openings 120B, and the dilution air inlet openings 120C. As shown by FIGS. 1, 3, and 4, air entering the combustor through an atomization button 96 first traverses a path around line of intersection 94, generally parallel to the dome 90, and directed inwardly of the combustor, away from the outer wall 86 prior to turning the corner and entering the atomization button in a direction aligned with longitudinal axis 32. Air entering the first set of air inlet ports 120A enters the combustion chamber 138 generally parallel to the outer wall 86 as shown in FIG. 5 at arrows 140. Since the air flow at significant engine speeds is turbulent, the air represented by arrows 140 quickly becomes mixed in with the rest of the air and other gases traversing the combustion chamber.

Referring to FIG. 1, the mixture of air and fuel entering the combustor through the atomization buttons 96 is so rich in fuel that it cannot burn without additional air being incorporated into the mixture. Accordingly, the combination of the mixtures of air and fuel exiting the several atomization buttons establishes a primary "A" mixing zone 146 where the fuel and air are further mixed with each other. Since the direction of flow in the combustor is generally from the leading end 82 toward the trailing end 84, air entering the combustor through air inlet ports 120 generally does not penetrate the primary "A" mixing zone, whereby the mixture in the primary "A" mixing zone remains too rich in fuel to burn, and is thus, in general, substantially free from flame. As a result of the mixture in the primary "A" zone being too rich to burn, the "too rich" mixture of air and fuel serves as an insulating layer that insulates the dome from the convective heat of the combustion flame in the combustor, whereby the dome 90 and the fuel manifold are, in general, not exposed to the convective heat of the combustion flame.

As seen in FIGS. 1–4, the first set 120A of air inlet openings is disposed proximate the atomization buttons, with the centerline 148 of the first set of air inlet openings 120A axially spaced from the discharge ends 102 of the respective atomization buttons 96, away from the dome 90, a distance of about 0.1 inch to about 0.5 inch (about 2.5 centimeters to about 13 centimeters). Each air inlet opening 120A is rotationally displaced, upstream in the airflow, from the respective atomization button, as shown in FIG. 2.

Accordingly, air entering the combustor through each air inlet opening 120A, initially travels generally parallel to the inner surface of outer wall 86, and parallel to the dome 90. In such path, the air from each inlet opening 120A washes over the respective atomization button, receiving and mixing with the fuel-rich mixture of air and fuel from the primary "A" mixing zone. The mixture from the primary "A" mixing zone is thus diluted with air from the air inlet openings 120A as the mixture exits the primary "A" mixing zone, with the dilution being sufficient that the resulting mixture of fuel and air can be combusted. Accordingly, primary combustion takes place in the primary "B" combustion zone 150, which is associated with air inlet openings 120A.

As those skilled in the art will appreciate, especially when the engine is running with full, or nearly full, power, typically less than all of the fuel is combusted in the primary "B" combustion zone. Thus, the air entering the second set of air inlet openings 120B provides additional oxygen for completing combustion of substantially all the fuel, which completion of combustion takes place in the secondary combustion zone 152. Accordingly, secondary combustion zone 152 is associated with air inlet openings 120B.

As with the air entering the first set of air inlet openings, the air entering the second set of air inlet openings 120B initially washes tangentially and circumferentially over the inner surface 134 of the outer wall 86, thus cooling the outer wall before mixing into the normal toroidally shaped air flow in the secondary combustion zone. Similarly, dilution air entering the combustor at the third set of air inlet openings 120C washes tangentially and circumferentially over the inner surface 134 of the outer wall 86 before mixing with the combustion gases travelling toward the nozzle blades 54. Accordingly, the dilution zone is associated with air inlet openings 120C.

In combination, then, the air entering the combustor 60 through the air inlet openings 120 in outer wall 86 forms a generally continuous insulating layer 154 between the outer wall and the combustion zone, which protects the outer wall from convective contact with the combustion flame.

Combustion in turbine engines of the invention is generally confined to the primary "B" and secondary combustion zones 150 and 152, which define an overall combustion zone 156 represented by the dotted outline in FIG. 1. The "overall combustion zone", of course, increases and decreases in size, mainly in length, and shifts longitudinally in the combustor, in combination with increases and decreases in the power being developed by the turbine engine 1; and is defined at any given instant by the outer boundary of flame taking part in the combustion process.

It will be appreciated that, with the fuel being injected adjacent the dome 90, and with combustion air being injected closely adjacent each atomization button, the leading edge of the overall combustion zone 156 will be spaced from, but adjacent, the dome, and will extend downstream in the combustor a distance generally related to the amount of fuel being combusted in the combustor. Accordingly, at low fuel flow rates, the overall combustion zone, also known as the flame zone, will be confined in a relatively small space adjacent the mixing zone, and can be confined substantially completely to the primary "B" combustion zone. As additional fuel flow is added to the combustor, the space occupied by the overall combustion zone becomes more elongated to include increasingly larger portions of the space designated in FIG. 1 as the secondary combustion zone 152. A representative more elongated configuration of the overall combustion zone 156 is illustrated in FIG. 1.

Exhaust tube 74 and nozzle throat 56, in combination, form an inner casing 157 spacing the inner wall 88 of the combustor 60 from the exhaust tube 74 and the nozzle throat 56, with an intervening inner cooling passage 158, the inner cooling passage 158 terminating at exhaust opening 159 whereby the inner wall is cooled by air passing through the inner cooling passage 158 and exhausted into the combustion chamber at exhaust opening 159. Accordingly, air traversing the annular liner passage 124, flows around the dome 90, through inner cooling passage 158, and into the combustion chamber, thus cooling the inner wall 88.

By routing the air entering the combustor through the air inlet openings in smooth curvilinear paths at the inner surface of the outer wall, the outer wall 86 is inherently protected from potentially disastrous temperatures that can destroy the combustor. By providing the primary "A" mixing zone adjacent the dome 90, the dome is correspondingly protected from potentially destructive effects of heat of combustion at high engine speeds.

The inner wall 88 is protected by the flow of air from compressor 34 through inner cooling passage 158.

The inventor herein has surprisingly discovered that expressing the fuel-air mixture from the confined space inside the atomization buttons as a fuel-rich mixture, and using the primary "A" mixing zone to further mix the fuel and air outside the atomization buttons, outside the combustion zone, but inside the combustor, provides sufficient uniformity to the fuel-air mixture by the time the mixture reaches the combustion zone that combustion can be supported at low engine speeds. Typical small turbine engines of the prior art have operational speeds somewhat in excess of 100,000 revolutions per minute (rpm), for example 120,000 rpm, but wherein speeds of no less than about 50,000 rpm are required to reliably sustain combustion in the combustion chamber. At shaft speeds below 50,000 rpm, prior art engines tend to flame out because the flame propagation becomes unstable. Thus, in such engines, the minimum idle speed is about one-half the maximum operating speed.

Using the teachings herein related to design of the combustor and the fuel injection system, the fuel-air mixture inside the combustor ranges from an excessively rich and relatively uniform mixture adjacent the discharge end of the atomization buttons to a much leaner mixture as far away as the secondary combustion zone 152. Accordingly, the fuel distribution system of the invention can provide a range of fuel-air mixture ratios in the combustion chamber at any given point in time such that the existing flame front continuously seeks out an acceptable fuel-air mixture to thus sustain the ongoing combustion. At low fuel flow rates, a richer fuel-air mixture is required to sustain combustion whereby the leading edge 160 of the flame front defining the leading edge of the combustion zone 156 migrates relatively closer to, and may touch, the dome 90. However, a flame free primary "A" mixing zone is still generally contemplated, at least adjacent each atomization button, though at low extremes of engine speed, the "flame free" characteristic may disappear. At higher fuel flow rates, a leaner fuel mixture is preferred whereby the leading edge 160 of the flame front migrates further away from the dome 90. Further, the fuel-rich, but combustible, mixture in the primary "B" combustion zone, and adjacent the primary "A" mixing zone, is beneficial for initial ignition of the engine.

In typical operation, the overall combustion zone 156, as defined by the outer edges of the flame of combustion, is spaced from the outer wall and the dome by insulating air and the fuel-air mixture in the primary "A" mixing zone.

Given the above described range of fuel-air mixtures within the combustion chamber, in the presence of an active flame of combustion, ignition can be achieved, and combustion can be reliably maintained, at speeds much lower than speeds maintainable in prior art small turbine engines. Speeds in the range of 40,000 rpm, preferably 30,000 rpm, 20,000 rpm, and as low as 10,000 rpm, or less, can be maintained using turbine engines, and especially combustors and fuel systems, of the invention. At the lower speeds of 30,000 rpm or less, low fuel and air pressures of e.g. no more than about 5 psig, and down to as low as 1 psig, are preferred. It is anticipated that air and fuel pressures less than 1 psig are possible where the incentive warrants such specifications and designs. As with prior art engines, the turbine engines of the invention are capable of sustained operation at the typical operating speeds recognized in the industry, those speeds being in excess of 100,000 rpm, up to e.g. 120,000 rpm. Thus engines of the invention, idling at e.g. 10,000 rpm, and having maximum operating speed of e.g. 120,000 rpm, can idle at speeds as low as one tenth their maximum operating speed. Higher minimum idle speeds of e.g. about one-fifth, one-sixth, or one eighth, the maximum operating speed are also contemplated, depending on the degree to which the improvements disclosed herein are implemented.

While specific operating conditions such as speed and sustaining of combustion, of course, depend on the specifics of the components used, in general, engines using combustors as disclosed above can maintain sustained combustion at low air and fuel pressures. At low operating speeds, the fuel and air pressures may be approximately the same, e.g. 10 pounds per square inch gauge (psig) for both air and fuel. The fuel and air pressures can be lower, such as 5 psig, 2 psig, or even as low as 1 psig or less for both air and fuel pressures. It will, of course, be understood that at such low pressure of air and fuel, flows of both air and fuel can be laminar rather than turbulent. Especially, the invention contemplates sustained combustion at air flows in the combustion chamber that are laminar outside the combustion zone. Further, at such low air and fuel pressures, all the fuel can become vaporized before exiting the atomization button 96.

At higher flow rates of air in the atomization buttons, the air may rend the fuel particles by a physical shearing action or the like. At low rates of flow of air (e.g. 1 psig), the air serves more as a medium into which the fuel evaporates, such that physical shearing or other dismemberment of droplets of fuel is largely obviated. As especially air flow rate increases, the mechanism for fuel dispersion in the air is transformed into a physical rending-type action where droplets of liquid fuel are fragmented prior to the phase transformation associated with vaporization.

As the rate of air flow decreases in combination with decreased shaft speed, the leading edge of the combustion zone moves closer to the dome. As the leading edge of the combustion zone moves closer to the dome, the size of the primary "A" mixing zone 146 is reduced.

At the lower range of idle speeds, e.g. below about 30,000 rpm, the combustion zone may reach so far forward in the combustor that it touches the dome 90. While it is preferred that the overall combustion zone be spaced from the dome at all conditions of operation, the dome tolerates the flame of the combustion zone at low shaft speeds because of the low amount of absolute heat being produced at such low shaft speeds.

The low idle speeds achievable with turbine engines of this invention contribute to reduced fuel consumption, wider range of operating speeds, reduced amounts of stress on the engine at idle, reduced thrust and noise at idle, and similar related benefits.

Referring to FIGS. 1 and 2, resiliently deflectable spacers 162, made of e.g. resiliently deflectable metal sheet, are mounted to the dome 90. Spacers 90 extend to and separably interface with rear casing wall 72, to provide resilient and physically contacting abridgement structure between the dome and the rear casing wall. As outer casing 62 is mounted over the combustor 60, and secured to the air inlet housing at flange 18, rear casing wall 72 engages spacers 90 which resist further approach by wall 72 while resiliently deflecting in a spring-like action, to form a resistive engagement abridging the dome and the rear casing wall.

In the embodiment illustrated, the spacers are secured only to the dome. Spacers 90 contact the rear wall of the outer casing only when the dome and rear wall are brought together at assembly. While spacers 90 may be secured to the rear wall at assembly, such securement is not necessary, and should in any event be a releasable securement, to facilitate subsequent disassembly.

The spacers 90 can accommodate expansion and contraction of especially the combustor as the turbine engine 1 heats up and/or cools down, by deflecting in accord with the expansion and contraction, while maintaining modest and constant spacing pressure between the dome 90 of the combustor and the rear casing wall 72, providing proper relative positioning between dome 90 and rear casing wall 72. Thus, spacers 90 accommodate changes in the distance between the dome and the rear casing wall while maintaining abridging contact therebetween. Spacers 90 could, of course, be equally well mounted on the rear casing wall 72 if desired, and extend toward dome 90.

Referring now to FIG. 1, the compressor discharge plenum 76 receives air from the compressor and accommodates flow of the air toward and away from the longitudinal axis 32 in a toroidally-shaped space, generally along an imaginary series of radially-spaced plane-like surfaces (not shown) extending along and typically containing the longitudinal axis. Thus, the compressor discharge plenum can operate as a pneumatic accumulator, as well as a pneumatic shock absorber, correspondingly stabilizing the flow of compressed air to the combustor.

Referring now to both FIGS. 1 and 6, the bearing outer flange 46 includes a plurality of entrance ports 164 spaced about its circumference and penetrating into cooling cavity 49, the entrance ports, in combination, establishing an entrance path for flow of air from compressor discharge plenum 76 into cooling cavity 49. Exit ports 166 are spaced about rear sleeve 44 of end plate 38, establishing, in combination, an exit path for flow of air from cooling cavity 49 to turbine wheel 36 as illustrated by the dashed line and arrows 168.

The rear bearing 28 is potentially especially vulnerable to heat present at turbine wheel 36 because of its proximity to the turbine wheel. The air flowing through cooling cavity 49 serves to obviate such vulnerability by removing heat reaching the bearing end plate 38 and the bearing seal plate 48, and thereby protecting rear bearing 28, by conveying cooling air, from the compressor discharge plenum 76, into the cooling cavity through entrance ports 164, through the cooling cavity, out of the cooling cavity at exit ports 166, and by the exit path to the nozzle at turbine wheel 36. Accordingly, the air flowing through cooling cavity 49 extracts heat from end plate 38 and seal plate 48, thus providing a thermal break between the rear bearing 28 and the turbine wheel 36, maintaining the temperature at rear bearing 28 sufficiently low that bearing failure from thermal stress, either on the bearings or on bearing lubricants, is effectively prevented.

A problem encountered with bearings on small turbine engines is that the bearings should be mobile along the longitudinal axis of shaft 30 in accommodating changes in operating temperature of the engine. In prior art small gas turbine engines, the bearings themselves were allowed to move along the longitudinal axis in contact with the bearing sleeve. Referring specifically to FIG. 6, the bearing assembly 23 incorporates front and rear bearing cups 170 and 172 spacing the front and rear bearings 26, 28 respectively from bearing sleeve 25. The bearings 26, 28 are spaced from each other by bearing pre-load spring 174. The inner surface 176 of bearing sleeve 25 includes an elongated slot 178, receiving a key 180 on front bearing cup 170. Slot 178 is sufficiently long that key 180 can slide longitudinally in the slot in accommodating thermally related expansion and contraction of the engine, while confining the key 180 against rotation with the bearing. Corresponding slot and key (not shown) are preferably also used in conjunction with rear bearing 28. Accordingly, longitudinal side loading of the bearings is substantially reduced, resulting in increased bearing life.

It is contemplated that the operation and functions of the invention have become fully apparent from the foregoing description of elements, but for completeness of disclosure flow of air, fuel, and combustion gases through the engines of the invention will be briefly described.

Referring primarily to FIG. 1, the general flow of air through the engine is shown by an elongated line of arrows 182 extending from the air inlet housing to the exhaust tube. The illustrated flow, of course, extends about the circumference of the engine.

In routine operation, air is taken into the engine at air inlet housing 12. The air is compressed by compressor 32, preferably to a pressure ratio of between about 2/1 and about 3/1, is discharged past diffuser blades 22 and the deswirl cascade 24, and is temporarily received in the compressor discharge plenum 76, where the compressed air circulates generally in a path outlined by the arrows 182. A cooling bleed portion of the compressed air enters and traverses the cooling cavity 49 through entrance ports 164 and exit ports 166, and is discharged at turbine wheel 36.

The main body of compressed air exits the compressor discharge plenum 76 and enters the annular liner passage 124 between the outer wall of combustor 60 and the outer casing wall 70. As the air traverses the annular liner passage 124, portions of the air are progressively diverted into the combustion chamber 138 through air inlet openings 120C, 120B, 120A, and ultimately through pre-mix assemblies 66.

At pre-mix assemblies 66, the air enters the atomization buttons 96. In the atomization buttons, the air receives, and mixes and intermingles with, fuel being expressed from fuel exit openings 110, forming a first bulk mixture of the main bodies of flow of the fuel and air.

The first bulk mixture so produced is typically so rich in fuel that the mixture is not combustible; and may be somewhat heterogeneous. This non-combustible first bulk mixture of fuel and air is expressed from the respective atomization buttons 96 into the combustion chamber 138 where it undergoes further internal mixing in the generally flame-free, and relatively small, primary "A" mixing zone 146, where further mixing takes place and the mixture becomes more uniform, and at the same time insulates the dome 90 from heat of combustion in the combustion chamber 138.

This more uniform mixture exits the mixing zone 146, moving forwardly in the engine to the primary "B" combustion zone 150 where it mixes with air being introduced into the combustion chamber 138 through air inlet openings 120A.

Air enters through openings 120A in a direction that initially takes it in a circumferential path along the inner surface 134 of the outer wall 86, whereafter the air traverses a more radial path toward the interior of the combustion chamber and, by means of the juxtapositioning of the openings 120A closely spaced from the atomization buttons 96, sweeps past the atomization buttons drawing the fuel rich mixture from the mixing zone into the primary "B" combustion zone, and, in the process, forming a combustible mixture therewith.

The combustible mixture is ignited in the primary "B" combustion zone, either by an existing flame, or by an igniter, not shown. Primary combustion takes place in the primary "B" combustion zone. Especially at rated capacity, less than all the fuel is consumed in the primary "B" combustion zone, typically because of a less than stoichiometric amount of oxygen. Fuel not consumed in the primary "B" combustion zone is combusted in the secondary zone when mixed with the additional oxygen-laden air entering through air inlet openings 120B.

Dilution air enters through air inlet openings 120C, reducing the temperature of the gases in the combustor to a desirable temperature acceptable at the nozzle, turbine wheel, and exhaust tube. Acceptable temperatures at the nozzle are the same as known in the art, and will vary depending especially on the materials from which especially the nozzle, the turbine wheel, and the exhaust tube are fabricated.

In general, preferred engines of the invention generate medium thrust output relative to their size, and relative to their fuel consumption rates. Whereas high performance small engines use high performance temperatures of about 2000 to about 2200 degrees F. (about 1093 to about 1204 degrees C.), and achieve high fuel efficiency e.g. 1–1.3 pound fuel per hour per pound of thrust (1–1.3 kilogram of fuel per hour per kilogram of thrust), preferred engines of this invention operate at nozzle temperature of e.g. about 1500 to about 1800 degrees F. (about 816 to about 982 degrees C.), and at fuel consumption rates of about 1.5 pound fuel per hour per pound of thrust (1.5 kilogram of fuel per hour per kilogram of thrust). By maintaining a low temperature at the inlet to the nozzle assembly 50, and medium fuel consumption rates, less stress is placed on the materials in the engine. Thus low cost, ordinary materials, e.g. 404 stainless steel, can be used for the nozzle assembly 50 and the exhaust tube 74.

Further, cooling cavity 49 and compressor discharge plenum 76 so thermally insulate the bearing housing, the bearing assembly, and the air inlet housing from the heat of combustion that thermal demands on the bearing housing 20 and air inlet housing 12 are so minimal that standard aluminum alloys can be used for those elements. In addition to fabrication efficiencies relating to simplification of design of the outer wall 86, the cost of making engines of this invention is further reduced by the use of less expensive metals. Accordingly the cost of making turbine engines of the invention can be significantly less than the high performance small turbine engines typical of the prior art, which required expensive refractory metals with higher temperature capability.

Returning now to the air flow through the engine, the gases leaving the combustion chamber traverse through the nozzle blades, and into and through the turbine Wheel, in the usual manner, and are exhausted out the exhaust tube. The air passing through cooling cavity 49 rejoins the gases from the combustion chamber at the turbine wheel, as shown in FIGS. 1 and 6.

A bleed portion of the air entering the liner passage passes around the dome 90 and traverses the cooling passage 158 between the inner wall of the combustor and the inner casing 157, providing a film of cooling air between the inner wall and the inner casing, thus reducing the temperature at the inner wall. The cooling air exits the cooling passage 158 back into the combustion chamber at exhaust opening 159.

While this teaching has focused on small turbine engines of six inches or less diameter, the teachings herein can find application in larger turbine engines as well. Thus, the claims that follow are not limited to small diameter engines, but are rather directed to engines of all sizes, except where specifically noted, if noted at all. Where noted, a "small turbine engine" means an engine having an overall diameter at outer casing 62 of no more than about six inches (15 centimeters).

EXAMPLES

Two engines were built according to the design above described and illustrated in the drawings, except that the line of intersection 94 was replaced with a detente about the circumference in the dome 90 and in outer wall 86, which detente received the fuel manifold 64. The engine of Example 1 was 4.5 inches diameter. The engine of Example 2 was 5.5 inches diameter. Table 1 illustrates performance characteristics of the engines of Examples 1 and 2. Speed is rpm. Pressure is the ratio of the pressure before and after the compressor. T.I.T. is "turbine inlet temperature" in degrees F. (degrees C.). Thrust is in pounds of force.

TABLE 1

| Example | Speed | Pressure | T.I.T. | Thrust |
|---------|---------|----------|-----------|--------|
| 1 | 112,000 | 2.7/1 | 1500(816) | 20 lbs |
| 2 | 120,000 | 3.1/1 | 1675(913) | 35 lbs |

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A combustion assembly for a turbine engine, said combustion assembly including a combustor having a leading end and a trailing end, a longitudinal axis, an outer wall spaced from, and extending about and along the longitudinal axis, an inner wall extending about and along the longitudinal axis between the longitudinal axis and said outer wall, and a dome connecting said outer and inner walls at the leading end of said combustor at respective first outer and second inner annular lines of intersection therewith, thereby forming a combustion chamber between said inner and outer walls, an outer casing extending about said combustor to thereby define an annular liner passage between said outer wall and said outer casing, said outer wall comprising a tube have a base outer surface, and a plurality of axially spaced air inlet openings formed in, and as integral parts of, said tube, for directing air, from loci adjacent said base outer surface, generally circumferentially into said combustion chamber.

2. A combustion assembly as in claim 1, said outer wall having an inner surface disposed inside said combustion chamber, said outer surface opposing said inner surface and being outside said combustion chamber, said air inlet openings comprising channels formed in said outer wall and extending inwardly of the base outer surface, into said combustor at upstream sides of the respective said air inlet openings, and crowns formed in said outer wall and extending outwardly of the base outer surface of said outer wall, and away from said combustion chamber, at downstream sides of the respective said air inlet openings, said channels and said crowns, in combination, at the respective said air inlet openings, being disposed and configured to direct air, from said base outer surface, generally circumferentially into said combustion chamber.

3. A combustion assembly as in claim 1, said combustion chamber having an annular configuration between said inner and outer walls.

4. A combustion assembly as in claim 1, said combustor further including a fuel injection system, including pre-mix assemblies spaced about and propinquant said first outer annular line of intersection, each said pre-mix assembly comprising an atomization button and a fuel supply tube in the respective said atomization button, for introducing fuel and air into said combustion chamber adjacent said first outer annular line of intersection, by directing, into said combustion chamber, streams of mixtures of fuel and air at locations spaced about said first outer annular line of intersection, the streams of mixtures of fuel and air expressed from said pre-mix assemblies being directed circumferentially into said combustor, and generally transverse to the longitudinal axis for further mixing in an adjacent, substantially flame free, primary "A" mixing zone.

5. A combustion assembly as in claim 2, said combustor further including a fuel injection system, including pre-mix assemblies spaced about and propinquant said first outer annular line of intersection, each said pre-mix assembly comprising an atomization button and a fuel supply tube in the respective said atomization button, for introducing fuel and air into said combustion chamber adjacent said first outer annular line of intersection, by directing, into said combustion chamber, streams of mixtures of fuel and air at locations spaced about said first outer annular line of intersection, the streams of mixtures of fuel and air expressed from said pre-mix assemblies being directed circumferentially away from said outer wall, inwardly of said combustor, and generally transverse to the longitudinal axis for further mixing in an adjacent, substantially flame free, primary "A" mixing zone.

6. A combustion assembly as in claim 4, said axially spaced air inlet openings including a first set of said air inlet openings disposed proximate said atomization buttons, away from said dome.

7. A combustion assembly as in claim 4, said axially spaced air inlet openings including a first set of said air inlet openings disposed, from said atomization buttons, away from said dome a distance between 0.1 inch and 0.5 inch.

8. A combustion assembly as in claim 5, said axially spaced air inlet openings including a first set of said air inlet openings disposed proximate said atomization buttons, away from said dome.

9. A combustion assembly as in claim 5 said axially spaced air inlet openings including a first set of said air inlet openings disposed, from said atomization buttons, away from said dome a distance between 0.1 inch and 0.5 inch.

10. A combustion assembly as in claim 6, each said air inlet opening in said first set being disposed circumferentially upstream and adjacent a respective said atomization button, and being oriented to direct air into said combustion chamber and alongside the respective said atomization button, thereby to form a primary "B" combustion zone adjacent and downstream of the primary "A" mixing zone.

11. A combustion assembly as in claim 8, each said air inlet opening in said first set being disposed circumferentially upstream and adjacent a respective said atomization button, and being oriented to direct air into said combustion chamber and alongside the respective said automization button, thereby to form a primary "B" combustion zone adjacent and downstream of the primary "A" mixing zone.

12. A combustion assembly as in claim 10, said axially spaced air inlet openings including a second set of said air inlet openings disposed, from said first set, away from said dome, to thereby form a secondary combustion zone in said combustor.

13. A combustion assembly as in claim 11, said axially spaced air inlet openings including a second set of said air inlet openings disposed, from said first set, away from said dome, to thereby form a secondary combustion zone.

14. A combustion assembly as in claim 13, said axially spaced air inlet openings including a third set of said air inlet openings disposed, from said second set, away from said dome, to thereby form a dilution zone in said combustor.

15. A combustion assembly as in claim 12, said first and second sets of said axially spaced air inlet openings including a common number of said air inlet openings in each said set, said air inlet openings in a given said set being spaced equidistant from each other, the individual said air inlet openings in said second set being rotationally displaced from respective individual said air inlet openings in said first set.

16. A combustion assembly as in claim 13, said air inlet openings in each of said first and second sets being spaced equidistant from each other, the individual said air inlet openings in said second set being rotationally displaced from respective individual said air inlet openings in said first set.

17. A combustion assembly as in claim 15, the angle of rotation, measured from a line parallel to the longitudinal axis, being between 30 degrees and 40 degrees.

18. A combustion assembly as in claim 16, the angle of rotation, measured from a line parallel to the longitudinal axis, being between 30 degrees and 40 degrees.

19. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said fuel exit opening describes an angle between 45 degrees and 135 degrees with the central axis of said fuel supply tube, said combustion assembly being adapted to sustain combustion, as part of a turbine engine, at engine speeds of less than 40,000 revolutions per minute.

20. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said exit opening describes an angle between 45 degrees and 135 degrees with the central axis of said fuel supply tube, said combustion assembly being adapted to sustain combustion, as part of a turbine engine, at engine speeds of less than 30,000 revolutions per minute.

21. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said exit opening describes an angle between 45 degrees and 135 degrees with the central axis of said fuel supply tube, said combustion assembly being adapted to sustain combustion, as part of a turbine engine, at engine speeds of less than 20,000 revolutions per minute.

22. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said exit opening describes an angle between 45 degrees and 135 degrees with the central axis of said fuel supply tube, said combustion assembly being adapted to sustain combustion, as part of a turbine engine, at an engine speed of no more than about 10,000 revolutions per minute.

23. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said fuel exit opening describes an angle between 45 degrees and 135 degrees with the central axis of said fuel supply tube, said combustion assembly being adapted to sustain combustion, as part of a turbine engine, at air pressure of about 1 pound per square inch gauge, fuel pressure of about 1 pound per square inch gauge, and engine speed of no more than about 30,000 revolutions per minute.

24. A combustion assembly as in claim 5, said atomization button having an internal passage, and a discharge end of said internal passage extending into said combustion chamber, said fuel supply tube being disposed in said internal passage of said atomization button, said fuel supply tube having a central axis, and a fuel exit opening for discharging fuel therefrom into said internal passage of said atomization button at a locus spaced from said discharge end, said fuel exit opening being so oriented within said internal passage that air passing through said internal passage and past said fuel exit opening describes an angle between 45 degrees and 135 degrees with the central axis of said fuel supply tube, said combustion assembly being adapted to sustain combustion, as part of a turbine engine, at air pressure of about 1 pound per square inch gauge, fuel pressure of about 1 pound per square inch gauge, and engine speed of no more than about 20,000 revolutions per minute.

25. A combustion assembly as in claim 19, said internal passage of said atomization button having an inlet end opposite said discharge end, said internal passage being aligned with said fuel supply tube proximate said inlet end.

26. A combustion assembly as in claim 19, said fuel exit opening being free from burrs and similar disturbances such that fuel emerges from said fuel exit opening in alignment with the central axis.

27. A combustion assembly as in claim 19, said internal passage being so configured and said fuel exit opening being so oriented within said internal passage that air passing through said internal passage and past said fuel exit opening changes direction by at least 45 degrees adjacent said fuel exit opening.

28. A turbine engine having a combustion assembly of claim 1.

29. A turbine engine having a combustion assembly of claim 2.

30. A turbine engine having a combustion assembly of claim 5.

31. A turbine engine having a combustion assembly of claim 8.

32. A turbine engine having a combustion assembly of claim 9.

33. A turbine engine having a combustion assembly of claim 11.

34. A turbine engine having a combustion assembly of claim 13.

35. A turbine engine having a combustion assembly of claim 16.

36. A turbine engine having a combustion assembly of claim 18.

37. A turbine engine having a combustion assembly of claim 20.

38. A turbine engine having a combustion assembly of claim 21.

39. A turbine engine having a combustion assembly of claim 22.

* * * * *